(12) United States Patent
Steinrück et al.

(10) Patent No.: US 6,230,991 B1
(45) Date of Patent: *May 15, 2001

(54) GAS VALVE WITH ELECTROMAGNETIC ACTUATION

(75) Inventors: Peter Steinrück, Hallstadt; Karl Rein, Vienna, both of (AT)

(73) Assignee: Hoerbiger Ventilwerke GmbH, Vienna (AT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/266,033

(22) Filed: Mar. 11, 1999

(30) Foreign Application Priority Data

Mar. 11, 1998 (AT) .................................................. 437/98

(51) Int. Cl.⁷ .................................................. F02M 51/06
(52) U.S. Cl. ................................. 239/585.1; 251/282
(58) Field of Search .................... 239/585.1, 585.3, 239/585.4; 251/129.07, 282

(56) References Cited

U.S. PATENT DOCUMENTS

| | | |
|---|---|---|
| 4,796,854 * | 1/1989 | Ewing ............................ 251/129.07 |
| 4,832,313 * | 5/1989 | Hashimoto et al. ............ 251/129.07 |
| 4,852,853 * | 8/1989 | Toshio et al. .................. 251/129.07 |
| 4,951,916 | 8/1990 | Kanameda et al. . |
| 5,108,071 | 4/1992 | Hutchings . |
| 5,641,148 | 6/1997 | Pena et al. . |

FOREIGN PATENT DOCUMENTS

| | | |
|---|---|---|
| 241880 | 10/1987 | (EP) . |
| 480545 | 4/1992 | (EP) . |
| 1235417 | 6/1971 | (GB) . |
| 1491062 | 11/1977 | (GB) . |
| 2250801 | 6/1992 | (GB) . |

* cited by examiner

*Primary Examiner*—Lesley D. Morris
(74) *Attorney, Agent, or Firm*—Dykema Gossett PLLC

(57) ABSTRACT

A gas valve with electromagnetic actuation, in particular a fuel-injection valve for gas engines, is provided with a sealing member which is actuable by way of the armature of a controllable electromagnet between the or each fuel supply and the or each fuel outlet and with at least one closure spring acting upon the sealing member. In order to provide a gas valve which has—at the same time—a large through-flow cross-section, exact operating and response times as short as possible and a low power consumption and which is also suitable for use in multi-point or ported-gas admission systems and in the case of supercharged engines, in particular in the case of gas engines for commercial vehicles or stationary gas engines, at least one device for compensating the differential pressure acting upon the sealing member is connected to the sealing member.

11 Claims, 1 Drawing Sheet

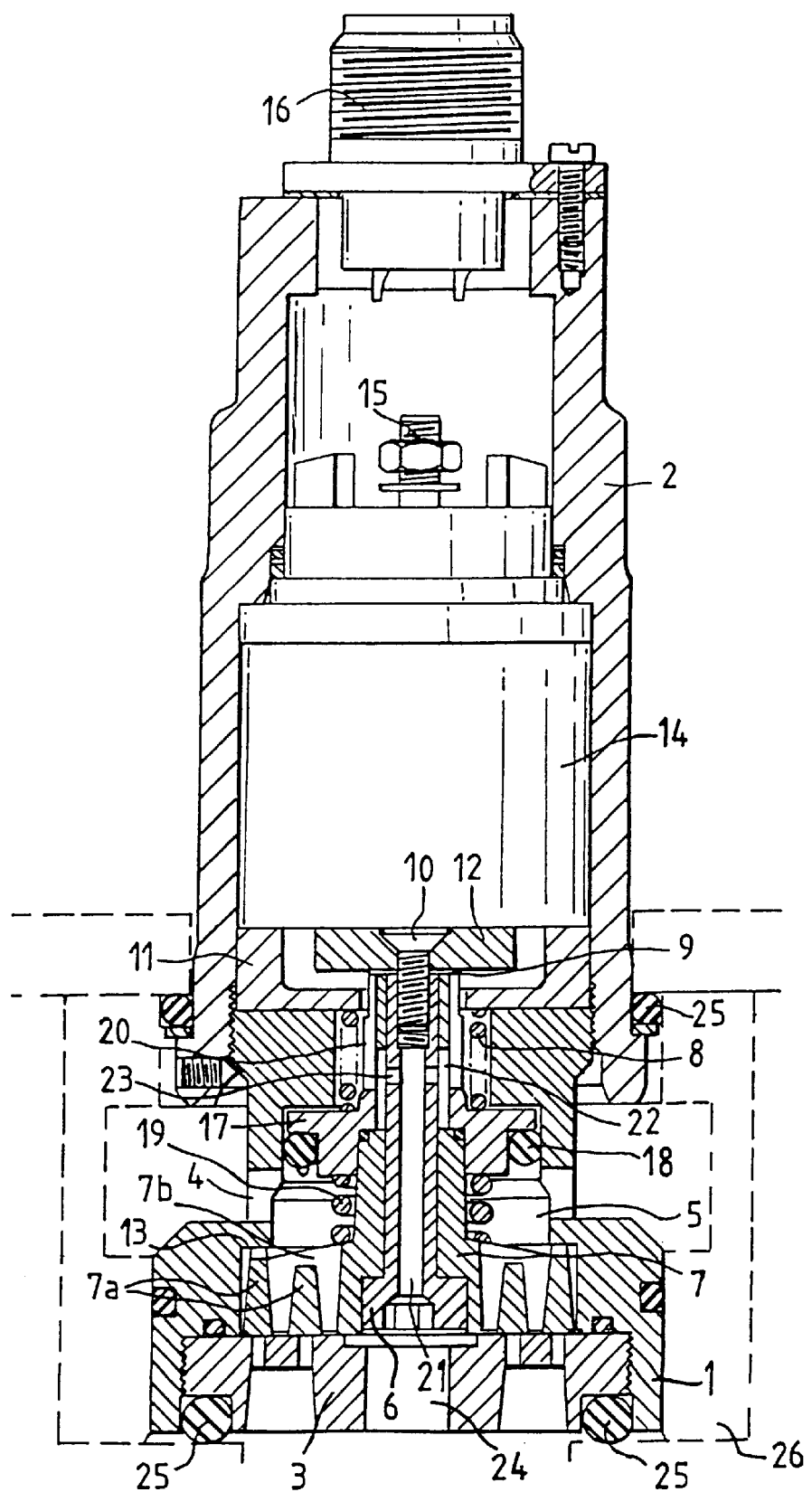

GAS VALVE WITH ELECTROMAGNETIC ACTUATION

BACKGROUND OF THE INVENTION

1. Field of the Invention

The invention relates to a gas valve with electromagnetic actuation, in particular to a fuel-injection valve for gas engines, which includes a sealing member which is actuable by way of the armature of a controllable electromagnet between a or each fuel supply and a or each fuel outlet and with at least one closure spring acting on the sealing member.

2. The Prior Art

In conventional gas engines based on the Otto principle, the fuel gas is admixed in the intake line and is then supplied to the cylinders. Control valves and static mixers, for example, are used in this procedure. However, these systems are too unwieldy for systems with electronic fuel injection. Gas nozzles switched by way of magnets and which meter the fuel and produce combustible mixture in the entire supply system have been used. For use in commercial vehicles, and in particular in the case of stationary gas engines, the excessively small throughflow cross-sections in the case of conventional gas valves have made it necessary to bunch together typically up to twelve of these gas valves in order to achieve adequate cross-sections (corresponding to a conventional central injection).

For the purposes of improved controllability, improved fuel use and more advantageous pollutant emission, however, systems are preferred which operate with the so-called multi-point injection or ported-gas admission and which supply each cylinder individually with its combustible mixture by way of separate injectors or valves. In this case, the quantity of gas supplied is controlled typically by way of the differential pressure, i.e., the difference between the supercharging pressure in the gas line and the gas pressure in the cylinder supply. In this case, the valves remain open over the greater part of the intakes stroke and the time control is carried out with respect to individual adaptation of the quantity of gas supplied to each individual cylinder. The valves known at present, however, are unsuitable for use in systems of this type, since they have insufficiently large throughflow cross-sections of at most 4 to 5 mm$^2$. On the other hand, however, the requirement of a larger throughflow cross-section involves increasing difficulties in achieving the brief and precise actuating times required and the high degree of precision in metering which is necessary. In addition, in the case of large valve cross-sections large and very powerful electromagnets have been necessary until now in order to move the large valve bodies against the action of the closure-spring arrangement and the differential pressure at the sealing member.

The object of the present invention has thus been to provide a gas valve which has—at the same time—a large throughflow cross-section, exact operating and response times as short as possible and a low power consumption and which is also suitable for use in multi-point or ported-gas admission systems and in the case of supercharged engines in particular in the case of gas engines for commercial vehicles or stationary gas engines.

SUMMARY OF THE INVENTION

This object is attained according to the invention in that at least one device for compensating the differential pressure acting upon the sealing member is connected to the sealing member. In this way, the pressure difference—adversely affecting the precision of the actuating and control times of the valve—between the side of the sealing member acted upon by the fuel gas under pressure and the outflow side under lower pressure is compensated and only the precisely determinable design of the closure spring and the electromagnet is decisive for the opening and closing of the valve. By compensating the differential pressure the electromagnet for actuating the valve can also be made smaller, since only the force of the closure spring and the mass inertia of the closure arrangement have to be overcome.

In one preferred embodiment, the device for compensating the differential pressure is in the form of at least one compensating piston which is acted upon with the fuel pressure in the opening direction of the valve, and gas passages are provided from the fuel outlet and/or outflow chamber to the opposite side of the compensating piston. In this way, the desired pressure compensation should be achieved at the sealing member in a structurally simple and reliable manner by the direct utilization of the pressure of the fuel to be controlled by the valve. The pressure in the compensating chamber is in turn set by way of the gas passages so as to be equal to the pressure in the fuel outlet and the outflow chamber, so that in each case the differential pressure at the sealing member is compensated by a differential pressure of equal magnitude and orientated opposite thereto at the compensating piston, and the resultant of the closure-spring force and the magnetic force is exclusively decisive for both the opening and the closure of the valve, and the precision of the valve actuation is not adversely affected by different pressure ratios in the system.

In order to ensure a relatively simple design of the valve, the compensating piston is guided displaceably in the valve housing in a sealed manner, and is clamped between the or each closure spring and the sealing member. Additional cylinder chambers or guides for the compensating piston can thus be omitted, and the production of the valve can be kept relatively simple and economical. The pressure of the fuel gas is used to counteract the closure spring and thus to form a compensation for the pressure upon the sealing member.

A structurally simple design, which causes the compensating piston to act directly upon the sealing member, is provided in accordance with a further embodiment of the invention when a central pin is inserted between the armature plate and the sealing member, and the compensating piston is formed by a projecting disc axially displaceable on the said central pin.

A simple and highly advantageous embodiment is provided in that at least one gas passage is formed by an opening in the sealing member and/or a bore in the central pin. In the first place, bores or similar structures which are complicated to produce in the valve housing are avoided, and, in addition, the bore in the central pin reduces the weight thereof, and this is advantageous for the speed of actuating the valve and the design of the electromagnet.

In order to achieve sufficiently large opening cross-sections and to be able to actuate the cross-sections in a rapid and precise manner independently of the existing pressure ratios, in accordance with a further feature of the invention the gas valve is constructed in the form of a flat-seat valve with a flat valve seat and a sealing member with at least one flat sealing face facing the valve seat, and the compensating piston bounds an annular space above the sealing member, into which the fuel supply opens, preferably radially.

The invention will be explained in greater detail in the following description with reference to an embodiment illustrated in the accompanying FIGURE.

BRIEF DESCRIPTION OF THE FIGURE

The FIGURE shows a cross section through a gas valve constructed in accordance with a preferred embodiment of this invention.

DETAILED DESCRIPTION OF THE PREFERRED EMBODIMENT

In the FIGURE a gas valve is shown which includes a valve body 1 and a magnetic tensioning nut 2 screwed onto an external thread of the valve body 1. The valve body 1 contains the valve seat 3 of at least one flat sealing strip, and for large valve cross-sections preferably several flat sealing strips of substantially circular design. The gaseous fuel or the combustible mixture, for example natural gas, liquefied gas or even hydrogen, passes through the preferably radial fuel inlets 4 into at least one preferably annular inlet chamber 5 in the valve body 1, but other inlet points or inlet directions are also possible. In this way, the gaseous fuel or the combustible mixture could also pass through at least one axial duct into the valve body 1, which for example can also extend through or to the side of the magnetic tensioning nut. In the case of very large valves there is frequently space for only one radial inlet opening which can then, however, have a very large cross-section. The inlet chamber 5 prevents the throughflow of the released valve cross-section from being adversely affected by flow phenomena, so that the entire opening cross-section is always traversed in an optimum manner and the maximum possible quantity of gas can pass through the valve.

The opening and closing procedure is carried out by a central pin 6 which supports the sealing member 7 resting on the valve seat 3 in the closed state of the valve. A closure spring 8 acts—indirectly in this case, as will be explained further below—upon the sealing member 7 which in the central region thereof surrounds the central pin 6 in the manner of a sleeve. The sealing member 7 is preferably produced from plastic material in an injection-moulding process in order to reduce the wear of the valve seat 3 and also the weight of the sealing member 7. The annular sealing strips of the valve seat are covered by peripheral webs 7a of the sealing member 7, recesses being left free between the peripheral webs 7a so that the fuel gas can reach the greatest possible area of all the sealing strips present. The radial webs 7b of the sealing member 7, which continuously connect all the peripheral webs 7a or only specific pairs or groups thereof, then ensure that the sealing peripheral webs 7a hold together and that the sealing member 7 is sufficiently strong.

The central pin 6 is connected—with the possible interposition of spacer plates 9 for compensating tolerances—by preferably one screw connection 10 to an armature plate 12 of magnetizable, relatively soft metal protected in a spacer member 11. The closure spring 8 is also supported on the underside of the bush 11.

The valve housing 1 has an inner edging 13 against which stop regions of the radial webs 7b of the sealing member 7 extending furthest outwards come to rest when the armature plate 12 is in the position thereof closest to the electromagnet 14, preferably a cup-shaped magnet. In this case the distance from the top of the stop areas of the sealing member 7 to the edging determines the valve stroke, preferably between 0.1 and 0.3 mm, and it is preferably always less than the distance of the armature plate 12 from the underside of the electromagnet 14 in the closed state of the valve, so that even with complete opening of the valve a free position is maintained between the armature plate 12 and the electromagnet 14. Even with high forces and rapid movements of the system comprising the armature plate 12, the central pin 6 and the sealing member 7, the armature plate 12 is prevented from striking against the likewise very soft material of the electromagnet 14. The electromagnet 14—controlled by way of the electronics of the injection system—is supplied with current by way of the threaded connecting pins 15, the current being supplied by way of the plug 16.

In order that the times for opening and closing the valve can be kept substantially, and preferably precisely, the same, and also the same for all the pressures occurring in the system, a compensating piston 17 is provided as a device for compensating the differential pressure at the sealing member 7. The pressure applying area of the said compensating piston 17 preferably corresponds precisely to that of the sealing member 7, so that the differential pressure acting upon the sealing member 7 can be compensated completely.

In order to set the force at the compensating piston so as to be equal at substantially any moment and orientated opposite to the force at the sealing member produced by the differential pressure and thus to influence both the opening and closing of the valve by the resultant of the closure spring force and the magnetic force, gas passages are provided from the fuel outlet 24 and/or outflow chamber and/or another area at the pressure prevailing there into a compensating chamber 20 on the side of the compensating piston 17 opposite the outflow chamber 24. In the present case this is the side of the compensating piston 17 opposite the sealing member 7. The noted gas passages used for the overflow are advantageously formed in the present case by a central bore 21 in the central pin 6 with radial discharge openings 23 and corresponding radial openings 22 in the bush-shaped part of the compensating piston 17 leading to compensating chamber 20. If the sealing member 7 is not to have a central opening through which the central pin 6 extends, at least one corresponding bore or through opening should also, of course, be provided in the sealing member 7. The pressure in the compensating chamber 20 follows the time pattern of the pressure in the fuel outlet 24 and the outflow chamber arranged downstream thereof with a time delay resulting from the throttling in the relatively narrow gas passages. In this way the operative direction of the force acting upon the compensating piston 17 can be reversed within a short time. It is therefore advantageous to make the gas passages as large as possible, in order to keep the throttling as low as possible and to ensure the quickest possible pressure compensation.

For opening the valve it is therefore only necessary for the electromagnet 14 to overcome the force of the closure spring 8 and the mass inertia of the armature plate 12, the spacer plates 9, the central pin 6 and the sealing member 7 itself. It is thus possible for small electromagnets 14 with a low power consumption to be used even in the case of valves with large opening cross-sections. The compensating piston 17 surrounds the central pin 6 as a substantially disc-shaped component which is sealed off by means of a continuous sealing ring 18 from the valve housing 1 guiding it and thus also at the same time guides the central pin 6 and the sealing member 7 centered in the valve housing 1. The closure spring 8 acts upon the compensating piston 17 and thus indirectly upon the central pin 6 and the sealing member 7 as well. A compensating spring 19, pre-stressed between the sealing member 7 and the compensating piston 17, holds the compensating piston 17 always resting directly against the armature plate 12 and the spacer plates 9, respectively. This prevents wear-producing sliding of the compensating piston 17 which is likewise preferably produced from plastic material.

Seals 25 on the outside of the valve housing provide for the sealed insertion of the gas valve in, for example, a gas-distributor strip 26 of the system into which the fuel or the combustible mixture flowing out of the valve is blown by way of the fuel outlet 24. The gas valve is preferably fixed in the gas-distributor strip 26 by a clamping plate (not shown) surrounding the magnetic tensioning nut 2.

Although a preferred embodiment of the invention has now been disclosed in detail, modifications therein can be made and still fall within the scope of the appended claims.

We claim:

1. A fuel injection valve which comprises:
   a valve body which defines a valve seat, a fuel outlet and a fuel inlet port,
   a housing connected to said valve body and containing an electromagnet,
   a sealing member positioned in said valve housing and movable against said valve seat to block said fuel outlet, said sealing member defining a fuel inlet chamber therearound in communication with said fuel inlet port,
   a compensating piston movably positioned in said valve body to contact and move said sealing member towards said valve seat,
   a closure spring for biasing said compensating piston and thus said sealing member towards said valve seat, and
   conduit means for conveying fuel to a compensating chamber on a side of said compensating piston opposite said valve seat.

2. A fuel injection valve according to claim 1, including a sealing ring positioned around said compensating piston and against said valve housing.

3. A fuel injection valve according to claim 1, including a central pin movably located in said valve housing, said sealing member surrounding a longitudinal portion of said central pin.

4. A fuel injection valve according to claim 3, wherein said central pin mounts an armature plate at an end thereof nearest said electromagnet.

5. A fuel injection valve according to claim 3, wherein said compensating piston is axially movable relative to said central pin.

6. A fuel injection valve according to claim 3, wherein said conduit means comprises a central bore in said central pin, and a radial opening in said central pin which is in communication with said central bore.

7. A fuel injection valve according to claim 6, wherein said conduit means further includes a radial opening in said compensating piston which communicates with said radial opening in said central pin.

8. A fuel injection valve according to claim 1, wherein said fuel inlet port directs fuel radially through a wall of said valve body to said fuel inlet chamber.

9. A fuel injection valve according to claim 8, wherein said fuel inlet chamber extends annularly around said sealing member.

10. A fuel injection valve according to claim 1, including a compensating spring located between said compensating piston and an annular portion of said sealing member.

11. A fuel injection valve according to claim 1, wherein said valve seat is flat and a face of said sealing member which contacts said valve seat is flat.

* * * * *